UNITED STATES PATENT OFFICE.

ALBERT P. McKEAN, OF SUNBURY, PENNSYLVANIA.

COMPOSITION OF MATTER AND METHOD OF MAKING SAME.

SPECIFICATION forming part of Letters Patent No. 523,678, dated July 31, 1894.

Application filed February 23, 1894. Serial No. 501,208. (No specimens.)

*To all whom it may concern:*

Be it known that I, ALBERT P. MCKEAN, a citizen of the United States of America, residing at Sunbury, in the county of Northumberland and State of Pennsylvania, have invented certain new and useful Improvements in the Composition of Matter and Method of Making Same, of which the following is a specification.

My said invention relates to an improved composition of matter and to the process of making the same, and the object of the invention is to produce a composition capable of being mixed with sand or other equivalent material either immediately after the manufacture or at any subsequent time for the purpose of producing an artificial stone of extreme hardness, capable of withstanding extremes of heat, and cold and moisture, and forming also a non-conductor of electricity.

The composition consists of the following ingredients in substantially the proportions named. *i. e.*—rosin twelve and one-half per cent., oil (preferably linseed) one-half of one per cent., japan one-sixteenth of one per cent., pulverized chalk ten per cent., sulphuric acid one-fourth of one per cent., litharge three-eighths of one per cent. These I mix together by the process hereinafter described, producing a compound which may be mixed with sand, or gravel, crushed rock, ashes or the like, as found desirable. When so mixed with sand or equivalent material an artificial stone is produced which is extremely hard, is impervious to air and moisture, and will withstand extremes of heat and cold, and is in addition a perfect non-conductor of electricity, rendering it extremely valuable for insulating purposes.

The composition may be mixed with sand or its equivalent at once, or may be laid aside for any length of time or shipped any distance and be then mixed, without detracting in the least from the effectiveness of the stone produced. By reason of this the composition may be manufactured at one place and shipped to any and all parts of the country and be then reheated and mixed with the bulk of the material going to make up the artificial stone thus reducing the actual quantity to be shipped to a minimum.

In manufacturing this composition I proceed as follows: The rosin is first poured into an iron vessel of convenient size, and the oil and japan, mixed together, are then poured over the rosin. When the mass is in a semi-fluid condition I add pulverized chalk, and when the above ingredients are thoroughly incorporated by agitation and boiling the litharge is added. When the mass has settled, or stopped foaming, I add the acid, distributing it as evenly over the surface of the mass as it is possible to do and immediately agitate violently until the acid ceases to make the mass boil.

When the composition is to be used at the place of manufacture the sand may, if desired be placed in the vessel first and the above ingredients added in the manner stated and after the addition of the acid the resultant mass is ready for use.

The composition may be remelted at about 300° Fahrenheit.

By the use of the above composition mixed with clean dry sand, gravel, or crushed stone there is formed a very hard coherent mass. As the material contains no water and melts at about 300° Fahrenheit it is impervious to air and moisture and is capable of resisting the utmost extremes of natural heat and cold and all atmospheric influences.

The material may be used as a coating for a pavement, may be made in the form of bricks, and in fact may be used for any purpose where such a coating is desirable. It is adapted to be used in the manufacture of artificial stone for building material in blocks or in the mass, also for steps, flag stones, curbs, caps and sills, as well as for surfacing pavements and side walks, cellars and basements, or the walls of buildings. I also apply it to the surface of wood, where it is desirable to protect such wood from the effects of the atmospheric action. It may also be used to protect piles from the attacks of the teredo, or for any covering where wood or other material requires protection. Its quality of adhesion renders it especially suitable for such purposes and it will also adhere to metal and may be used to cover tin sheets used for roofing or as a coating for tin roofs. Its flexibility and its quick drying or hardening property renders it specially applicable to such purposes. I contemplate also using it for tubes, pipes and conduits.

This composition may be colored with any tints by suitable mineral paints or pigments without detracting from its substantial qualities and this coloring matter I use when the material is employed for architectural purposes.

I claim—

1. The herein described composition of matter consisting of rosin, oil, japan, chalk, sulphuric acid, and litharge substantially in the proportions specified.

2. The process of manufacturing the described composition consisting first in heating rosin in a vessel, second in adding oil and japan, previously mixed, to the oil, third adding pulverized chalk and agitating the mass, fourth adding litharge and finally distributing acid over the mass and agitating it thoroughly until it ceases to boil, substantially as described.

In testimony whereof I affix my signature in presence of two witnesses.

ALBERT P. McKEAN.

Witnesses:
HENRY E. COOPER,
F. L. MIDDLETON.